July 22, 1924.

B. SETTERGREN 1,502,126

DIFFERENTIAL CLUTCH FOR POWER DRIVEN VEHICLES, ETC

Filed May 20 1920   2 Sheets-Sheet 1

Inventor:
Bernhard Settergren.

Witness:

By Frank D. Thousseau
Atty.

July 22, 1924.  
B. SETTERGREN  
1,502,126

DIFFERENTIAL CLUTCH FOR POWER DRIVEN VEHICLES, ETC

Filed May 20, 1920  2 Sheets-Sheet 2

Inventor
Bernhard Settergren
By Frank R. Thomason
Att'y.

Patented July 22, 1924.

1,502,126

UNITED STATES PATENT OFFICE.

BERNHARD SETTERGREN, OF CHICAGO, ILLINOIS.

DIFFERENTIAL CLUTCH FOR POWER-DRIVEN VEHICLES, ETC.

Application filed May 20, 1920. Serial No. 382,704.

*To all whom it may concern:*

Be it known that I, BERNHARD SETTERGREN, a citizen of the United States, residing at Chicago, in the county of Cook and State of Illinois, have invented new and useful Improvements in Differential Clutches for Power-Driven Vehicles, Etc., of which the following is a full, clear, and exact description.

This invention relates to differential clutches for motor vehicles and has for its primary aim the provision of novel and improved clutch mechanism for compensating for the difference in speed required between two driven traction elements on a vehicle when the same passes through a curved path of travel.

Another aim of the invention is to accomplish automatically the purpose outlined above by a comparatively simple and inexpensive means; to dispense with the divided driving axle and so-called differential gearing now quite commonly employed for compensation for the difference in speed of travel of the traction elements at times; and to provide means which may be quickly and facilely installed, and is readily accessible for repairs when necessary.

This I accomplish by the means hereinafter fully described and pointed out in the claims.

Figure 1:
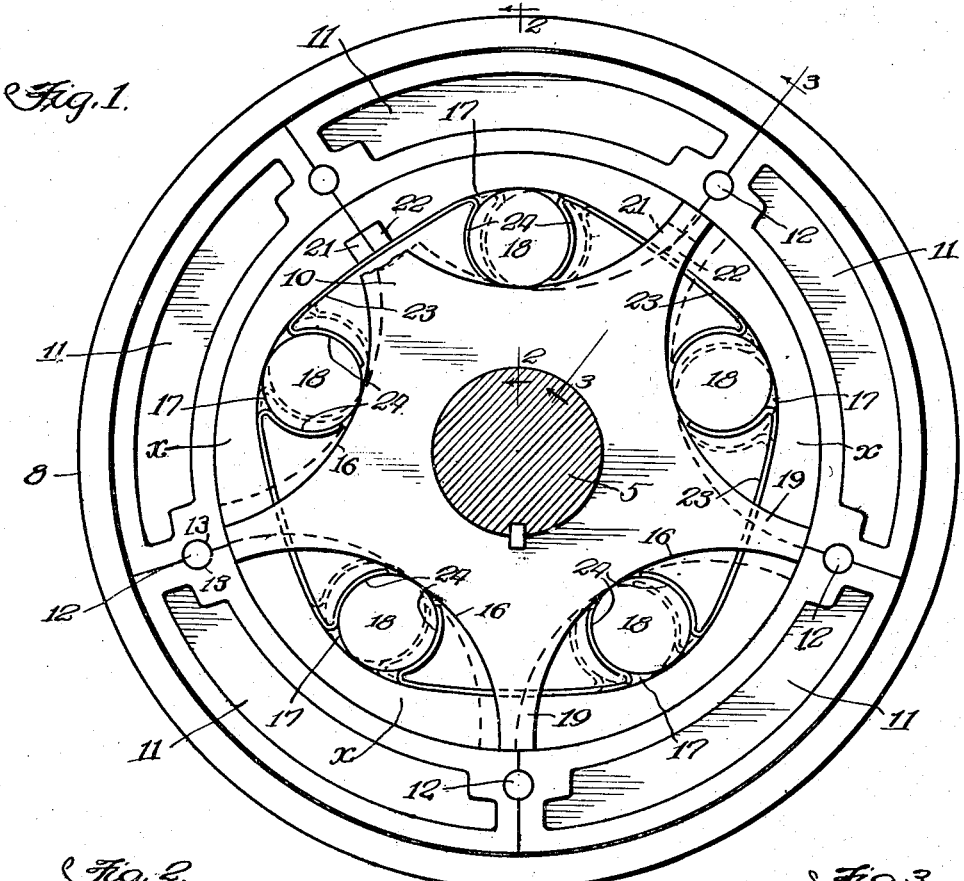
Figure 1 is a side view of my improved differential clutch with the side plate removed.
Figure 2:
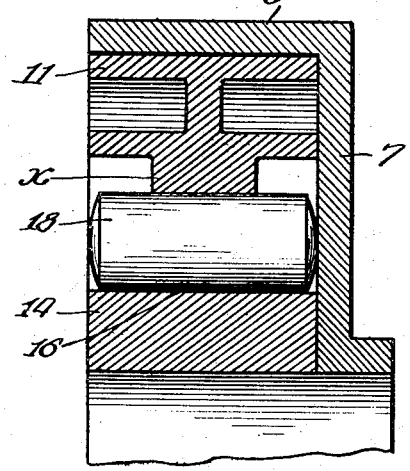
Figure 2 is a transverse section of about one half of the same taken on broken line 2, 2, Figure 1.
Figure 3:
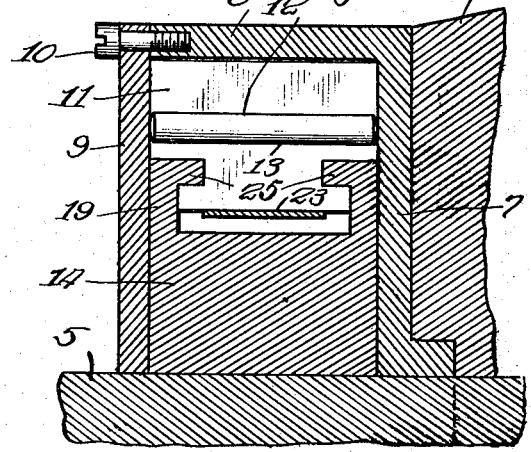
Figure 3 is a similar section taken on broken line 3, 3, Figure 1.
Figure 4:
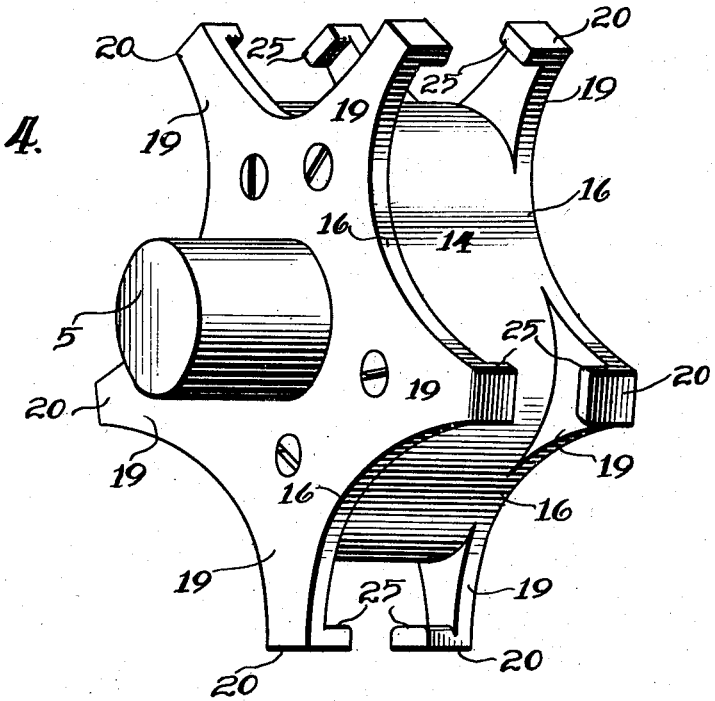
Figure 4 is an enlarged perspective view of the inner clutch member.
Figure 5:
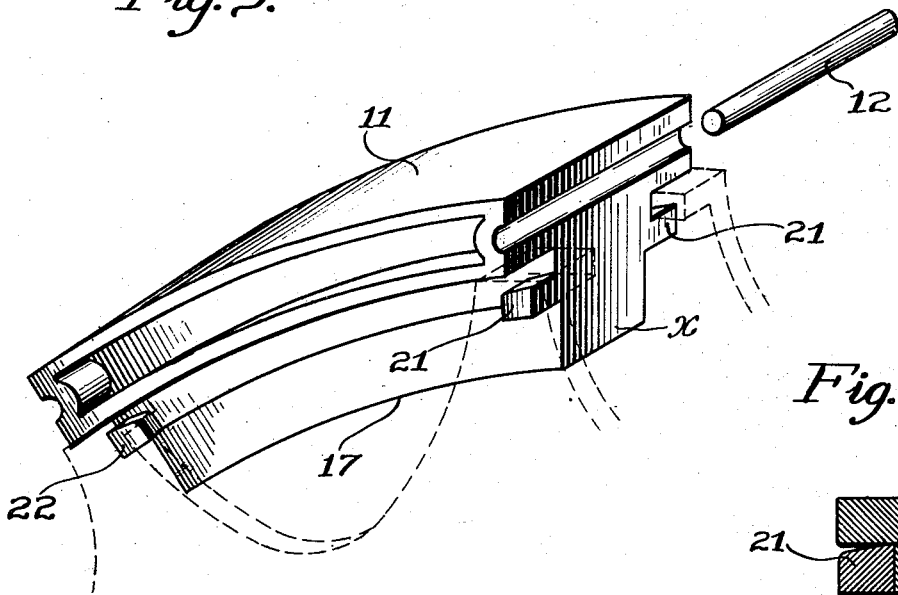
Figure 5 is a similar view of one of the sections of the outer clutch element.
Figure 6:
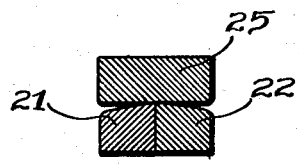
Figure 6 is a sectional view of a detail.

In the drawings 5, represents the drive-axle of a power driven vehicle, or the equivalent of an axle when my improvements are used for other purposes. Mounted on this axle, preferably, next the inner side of the hubs of wheels 6 (only a fragment of which is shown in the drawings) are the clutches embodying my invention. One clutch is used to drive each wheel, and as these clutches are identical in construction, the following description will answer for both.

This clutch comprises a cylindrical casing which is loose on the axle but is secured concentrically in any suitable manner to and revolves with the wheel. This casing is made in two parts, one part consisting of a side 7 that is cast integral with the rim 8, of the casing, and the other part consisting of a circular plate 9, which is secured to the adjacent annular edge of the rim by means of screws 10 inserted through holes in its margins and tapped laterally into said rim. Enclosed within this casing next the rim, which it is adapted to frictionally engage, is a slightly expansible annular clutch member consisting of a series of corresponding segmental sections 11. There are preferably, an odd number of these sections and the flat ends of each section are in a transverse plane alining with the radial line intersecting the center of the casing and the ends of each section 11 are secured to the abutting end of the next section by cylindrical keys, 12, that are seated, one half in a transverse groove 13, made in the end of one section and the other half in a corresponding groove made in the opposing end of the next section.

These sections are, at about their centers of width, of a depth, in a radial direction, about one half the radius of the inner circumference of the rim 8, and their outer portions are of a width substantially corresponding to the width of the interior of the casing. In the clutch illustrated in the drawings, I show the clutch member as being made of five segmental sections that are each 72 degrees in length. These sections combine to form a continuous circular clutch body and they separate slightly when it is expanded. This clutch body surrounds but is spaced apart from the inner clutch member or spreader 14 of my invention which latter is mounted upon and keyed or otherwise secured to the axle and always revolves therewith. The perimeter of this spreader 14 is provided with a series of five corresponding equi-distant concave seats 16, 16, the centers of the ridges between which are intersected by the radius intersecting the joints between sections 11— when the clutch member is contracted.

Seats 16, oppose concave seats or runways 17 in the inner surfaces of sections 11, and the curvature of the central portion of both seats 16 and 17 is of the same radius and transverse steel rollers 18 are inserted between each pair of opposed seats or runways.

The width of the inner portions $x$ of sections 11 or portions thereof nearest the axis of the clutch, in which the concave seats 17 hereinbefore referred to are made, is narrower than the outer portions of the same, and form, as it were, a continuous circumferential web projecting from the inner circumference of the floating clutch element composed of said sections. The series of concaved seats 16 in the perimeter of the spreader give it the appearance of a five point star the points 19, of which are truncated. These points, 19, or transverse crests between said seats 16 extend radially outward toward the joints between the sections 11, and project on either side of said web $x$. At the inner angles of the ends of sections 11, they are provided with corresponding lugs, 21 and 22, whose outer surfaces (those nearest the perimeter of the clutch) are struck from the same radii. The points 19 of the spreader are provided with lugs or fingers 25 that project transversely toward each other, and overlap lugs 21 and 22 when the casing is running loose. In this position the fingers 25 draw and hold the sections toward the axis of the clutch and out of engagement with the rim 8 of the casing. When the spreader has rotated on its axis a sufficient distance to enable fingers 25 to engage both the lug 21 on one end of each section and the companion lug 22 on the adjacent end of the next section, said fingers will, owing to the shape of their engaging surfaces move said sections toward the center of the clutch and cause them to move out of engagement with the inner circumference of the rim of the casing, and permit the latter and the wheel to which it is secured to revolve independently of the axle. When, however, the said spreader revolves independently of the clutch member in either direction to such an extent that the fingers 25 move out of engagement with one of said lugs 21 or 22, the movement of the rollers 18 will cause them to wedge between the concaved seats of the spreader and the sections of the clutch member and expand the latter and cause them to engage the rim of the casing and make it and the wheel to which it is attached revolve with the axle.

In order to make the rollers move simultaneously I have provided spacers 23, 23. These spacers consist of flat strips of spring metal that are shaped so that their bodies lap against the seats 17 of the sections 11 and extend over the ridges between seats 16, from one roller to the other and have their ends 24 bent inward and curved to bear against the opposite sides of the rollers to retain the same at equal distances apart without interfering with their action.

What I claim as new is:

1. In a clutch of the kind specified the combination with a drive axle, of a hollow casing loosely mounted thereon whose inner circumference is concentric to said axle, an inner clutch member securely mounted upon said axle within said casing, an outer expansible clutch member whose outer circumference has a slipping engagement with the inner circumference of the casing and a cylindrical rolling element interposed between said clutch members and movable circumferentially independently thereof which when said inner member revolves engages and causes said outer member to expand and engage the inner circumference of and transmit the motion of the axle to said casing.

2. In a clutch of the kind specified the combination with a drive axle, of a hollow casing loosely mounted thereon whose inner circumference is concentric to said axle, an inner clutch member securely mounted upon said axle within said casing, an outer concentric expansible clutch member consisting of a plurality of sections whose outer circumference has a slipping engagement with the inner circumference of the casing and an independently movable element interposed between said clutch members which when said inner member revolves engages and causes said outer member to expand and engage the inner circumference of and transmit the motion of the axle to said casing, said sections having butt end engagement, and transverse keys seated in grooves in said ends for connecting said sections.

3. In a clutch of the kind specified, the combination with a drive axle, of a hollow casing loosely mounted thereon whose inner circumference is concentric to said axle, an inner clutch member securely mounted upon said axle within said casing, an outer concentric expansible clutch member consisting of a plurality of sections whose outer circumference has a slipping engagement with the inner circumference of the casing, and a corresponding number of rolling elements interposed between said clutch members and movable circumferentially, independently thereof which when said inner member revolves engage and cause the outer member to expand and engage the inner circumference of and transmit the motion of the axle to said casing.

4. In a clutch of the kind specified the combination with the drive axle of a vehicle, of a hollow casing loosely mounted on and having its inner circumference concentric to said axle, an inner clutch member securely mounted on said shaft, having a plurality of corresponding seats in its perimeter, a concentric outer clutch member having a slipping engagement with the inner circumference of said casing and having a corresponding number of seats in its inner surface opposed to the seats in said inner member, and an independently circumferentially movable device interposed between each opposed pair of seats, and adapted to cause the outer member to expand and engage said casing and transmit the motion of the axle thereto.

5. In a clutch of the kind specified the combination with the drive axle of a vehicle, of a hollow casing loosely mounted on and having its inner circumference concentric to said axle, an inner clutch member securely mounted on said axle, having a plurality of corresponding seats in its perimeter, a concentric outer clutch member having a slipping engagement with the inner circumference of said casing and having a corresponding number of seats in its inner surface opposed to the seats in said inner member, and an independently circumferentially movable device interposed between each opposed pair of seats, and adapted to cause the outer member to expand and engage said casing and transmit the motion of the axle thereto.

6. In a clutch of the kind specified the combination with a drive axle, of a hollow casing loosely mounted thereon whose inner circumference is concentric to said axle, an inner clutch member securely mounted upon said axle within said casing, an outer expansible clutch member whose outer circumference has a slipping engagement with the inner circumference of the casing, a series of rollers interposed between said clutch members and operating in a circumferential path independently of said members which when said inner member revolves engage and cause said outer member to expand and engage the inner circumference of and transmit the motion of the axle to said casing, and means projecting radially beyond the surface of the inner clutch member for contracting said outer expansible member.

7. In a clutch of the kind specified the combination with the drive axle of a vehicle, of a hollow casing loosely mounted on and having its inner circumference concentric to said axle, an inner clutch member securely mounted on said shaft, having a plurality of corresponding seats in its perimeter, a concentric outer clutch member having a slipping engagement with the inner circumference of said casing and having a corresponding number of seats in its inner surface opposed to the seats·in said inner member, a movable device interposed between each opposed pair of seats operable in independent circumferential paths, and adapted to cause the outer member to expand and engage said casing and transmit the motion of the axle thereto, and means for contracting said outer expansible clutch member.

8. In a clutch of the kind specified the combination with the drive axle of a vehicle, of a hollow casing loosely mounted on and having its inner circumference concentric to said axle, an inner clutch member securely mounted on said shaft, having a plurality of corresponding seats in its perimeter, a concentric outer clutch member having a slipping engagement with the inner circumference of said casing, and having a corresponding number of seats in its inner surface opposed to the seats in said inner member, and a movable device interposed between each opposed pair of seats for movement circumferentially independently thereof and adapted to cause the outer member to expand and engage said casing and transmit the motion of the axle thereto, said inner clutch member having integral means extending beyond the seats thereof which when said casing revolves faster than said axle contracts said expansible member and permits the casing to revolve independently of the axle.

9. In a clutch of the kind specified the combination with the drive axle of a vehicle, of a hollow casing loosely mounted on and having its inner circumference concentric to said axle, an inner clutch member securely mounted on said shaft, having a plurality of corresponding seats in its perimeter, a concentric outer clutch member having a slipping engagement with the inner circumference of said casing, and having a corresponding number of seats in its inner surface opposed to the seats in said inner member, and a movable device interposed between each opposed pair of seats, and adapted to cause the outer member to expand and engage said casing and transmit the motion of the axle thereto, said inner clutch member having integral arms projecting radially therefrom beyond the seats thereof which when said casing revolves faster than said axle engage and contract said expansible member and permit the casing to revolve independently of the axle.

10. In a clutch of the kind specified the combination with a drive axle, of a hollow casing loosely mounted thereon whose inner circumference is concentric to said axle, an inner clutch member securely mounted upon said axle within said casing, an outer concentric expansible clutch member consisting of a plurality of sections whose outer circumference has a slipping engagement with the inner circumference of the casing, a corresponding number of rolling elements interposed between said clutch members which when said inner member revolves engage and cause said outer member to expand and engage the inner circumference of and transmit the motion of the axle to said casing, and spacing devices interposed between said rolling elements.

11. In a clutch of the kind specified the combination with the drive axle of a vehicle, of a hollow casing loosely mounted on and having its inner circumference concentric to said axle, an inner clutch member securely mounted on said shaft, having a plurality of corresponding seats in its perimeter, a concentric outer clutch member having a slipping engagement with the inner circumference of said casing and having a corresponding number of seats in its inner surface opposed to the seats in said inner member, a rolling device interposed between each opposed pair of seats, and adapted to cause the outer member to expand and engage said casing and transmit the motion of the axle thereto, and means interposed between the rolling device in one pair of seats and extending to the rolling device in the next pair of seats for spacing said devices apart.

12. In a clutch of the kind specified the combination with the drive axle of a vehicle, of a hollow casing loosely mounted on and having its inner circumference concentric to said axle, an inner clutch member securely mounted on said shaft, having a plurality of corresponding seats in its perimeter, a concentric outer clutch member having a slipping engagement with the inner circumference of said casing and having a corresponding number of seats in its inner surface opposed to the seats in the inner member, a rolling device interposed between each opposed pair of seats, and adapted to cause the outer member to expand and engage said casing and transmit the motion of the axle thereto, and means interposed between the rolling device in one pair of seats and extending to the rolling device in the next pair of seats having its ends curved inward and engaging the cylindrical sides of said devices for spacing said devices apart.

13. In a clutch of the kind specified, the combination with an axle, of a hollow casing loosely mounted thereon whose inner circumference is concentric to said axle, an inner clutch member securely mounted on said axle within said casing, and an outer expansible clutch member consisting of several sections arranged end to end and having lateral lugs projecting from their ends, which clutch member has a slipping engagement with the inner circumference of the rim of said casing, but which when said axle revolves is caused by said inner clutch member to expand, and engage the inner circumference of said rim, and impart the motion of said axle thereto, and means movable with said inner clutch member that comprises outwardly projecting arms having lateral fingers that engage said lugs and when said casing revolves faster than said axle, move the sections of said outer expansible clutch member toward the axle and permit the casing to revolve independently of the axle.

14. In a clutch of the kind specified, the combination with an axle, of a hollow casing loosely mounted thereon whose inner circumference is concentric to said axle, an inner clutch member securely mounted on said axle within said casing, and an outer expansible clutch member consisting of several sections arranged end to end, and having lateral lugs projecting from their ends, which clutch member has a slipping engagement with the inner circumference of the rim of said casing, but which when said axle revolves is caused by said inner clutch member to expand, and engage the inner circumference of said rim, and impart the motion of said axle thereto, said inner clutch member having integral arms projecting radially therefrom that are provided with fingers that engage said lugs, which when said casing revolves faster than said axle, move said sections of the outer expansible clutch member toward said axle and permit the casing to revolve independently of the axle.

15. The combination with an axle and a hollow casing loosely mounted on said axle and having its inner circumference concentric with said axle, of an inner clutch member rigid on said axle, said inner clutch member having a plurality of arcuate seats, an outer clutch member having its outer face concentric with the inner circumferential face of said casing and composed of a plurality of arcuate articulated sections having each an internal seat corresponding to the seats in said inner clutch member, a plurality of rotatable elements for expanding said sections and movable in said seats in independent circumferential paths, and means on the inner clutch member projecting beyond the seats thereof between said rotatable elements and engaging said articulated sections at their respective junctions for contracting the same.

In witness whereof I have hereunto set my hand and seal this 6th day of May, 1920.

BERNHARD SETTERGREN.

Witnesses:
FRANK D. THOMASON,
VIOLET WARDELL.